(12) United States Patent
Ranaweera et al.

(10) Patent No.: US 7,574,630 B1
(45) Date of Patent: Aug. 11, 2009

(54) METHOD AND SYSTEM FOR RELIABLE ACCESS OF EXPANDER STATE INFORMATION IN HIGHLY AVAILABLE STORAGE DEVICES

(75) Inventors: Samantha L. Ranaweera, Cranberry Township, PA (US); Andrew Reynolds, Mars, PA (US)

(73) Assignee: Network Appliance, Inc., Sunnyvale, CA (US)

( * ) Notice: Subject to any disclaimer, the term of this patent is extended or adjusted under 35 U.S.C. 154(b) by 432 days.

(21) Appl. No.: 11/504,200

(22) Filed: Aug. 14, 2006

(51) Int. Cl.
*G06F 11/00* (2006.01)
(52) U.S. Cl. ............................................ 714/43
(58) Field of Classification Search .............. 714/2–5, 714/13, 15, 16, 26, 31, 42, 43, 44, 56
See application file for complete search history.

(56) References Cited

U.S. PATENT DOCUMENTS

| | | | |
|---|---|---|---|
| 6,385,755 B1 * | 5/2002 | Shimomura et al. ......... | 714/819 |
| 6,883,065 B1 * | 4/2005 | Pittelkow et al. ............ | 711/114 |
| 6,948,012 B1 | 9/2005 | Valin et al. | |
| 7,069,468 B1 * | 6/2006 | Olson et al. ................... | 714/7 |
| 7,127,633 B1 * | 10/2006 | Olson et al. ................... | 714/4 |
| 7,434,107 B2 * | 10/2008 | Marks .......................... | 714/43 |
| 2006/0117211 A1 * | 6/2006 | Matsunami et al. ............ | 714/4 |
| 2007/0070885 A1 * | 3/2007 | Uddenberg et al. ......... | 370/225 |
| 2007/0088978 A1 * | 4/2007 | Lucas et al. ................... | 714/9 |

* cited by examiner

*Primary Examiner*—Nadeem Iqbal
(74) *Attorney, Agent, or Firm*—Blakely, Sokoloff, Taylor & Zafman LLP

(57) ABSTRACT

An apparatus and method for detecting an interface failure of a first interface of a first expander of a storage system, and retrieving state information from a second expander to the first expander using a second interface of the first expander when the interface failure of the first interface is detected. The state information is normally available to the first expander through the first interface, but is unavailable through the first interface due to the interface failure of the first interface.

32 Claims, 12 Drawing Sheets

METHOD AND SYSTEM FOR RELIABLE ACCESS OF EXPANDER STATE INFORMATION IN HIGHLY AVAILABLE STORAGE DEVICES

TECHNICAL FIELD

This invention relates to the field of storage systems and, in particular, to disk drive storage enclosures.

BACKGROUND

A file server is a network-connected storage server that stores and manages shared files in a set of storage devices (e.g., disk drives) on behalf of one or more clients. The disks within a file system are typically organized as one or more groups of Redundant Array of Independent/Inexpensive Disks (RAID). One configuration in which file servers can be used is a network attached storage (NAS) configuration. In a NAS configuration, a file server can be implemented in the form of an appliance that attaches to a network, such as a local area network (LAN) or a corporate intranet. An example of such an appliance is any of the Filer products made by Network Appliance, Inc. in Sunnyvale, Calif.

Another specialized type of network is a storage area network (SAN). A SAN is a highly efficient network of interconnected, shared storage devices. Such devices are also made by Network Appliance, Inc. One difference between NAS and SAN is that in a SAN, the storage appliance provides a remote host with block-level access to stored data, whereas in a NAS configuration, the file server normally provides clients with file-level access to stored data.

Current file server systems used in NAS environments are generally packaged in either of two main forms: 1) an all-in-one custom-designed system that is a standard computer with built-in disk drives all in a single chassis (enclosure); or 2) a modular system in which one or more sets of disk drives, each in a separate chassis, are connected to an external file server "head" in another chassis.

In this context, the term "head" means all of the electronics, firmware and/or software (the "intelligence") that is used to control access to storage devices in a storage system; it does not include the disk drives themselves. In a file server, the head normally is where all of the "intelligence" of the file server resides. Note that a "head" in this context is not the same as, and is not to be confused with, the magnetic or optical head used to physically read or write data to a disk.

In a modular file server system, the system can be built up by adding multiple chassis in some form of rack and then cabling the chassis together. The disk drive enclosures are often called "shelves" and, more specifically, "just a bunch of disks" (JBOD) shelves. The term JBOD indicates that the enclosure essentially contains only physical storage devices and little or no electronic "intelligence." Some disk drive enclosures include one or more RAID controllers, but such enclosures are not normally referred to as "JBOD" due to their greater functional capabilities. A modular file server system is illustrated in FIG. 1 and is sometimes called a "rack and stack" system. In FIG. 1, a file server storage server head 1 is connected by external cables to multiple disk shelves 2 mounted in a rack 3. The file server storage server head 1 enables access to stored data by one or more remote client computers (not shown) that are connected to the storage server head 1 by external cables.

Enterprise class storage appliances (e.g., filers) have unique and class-defining characteristics of their own, such as the stringent requirement to be up and running almost hundred percent of the time. In order to increase the amount of uptime, these appliances need to be resistant to certain types of errors. One conventional method employed to ensure that appliances keep serving data, despite catastrophic types of errors, is to provide multiple data paths. Provisioning of multiple data paths can be accomplished at different system level components. For example, in conventional storage appliances in highly available (HA) configurations, dual heads are provided to insulate against a broad range of motherboard level errors that would cripple a single head, but the remaining head would assume the identity of the fallen head, still serving data to the user of the fallen head.

Small computer system interface (SCSI), which has been inexistence for well over twenty years, has traditionally been used in a wide variety of enterprise class storage solutions. This multi-layered architecture is extensively used and acknowledged by industry leaders as a stable, feature rich extensible IO interconnect. The SCSI Architectural Model (SAM), has proven its reliability over four generations of parallel physical layers and asynchronous and synchronous transfer speeds, as well as being adopted by other popular physical interconnects, such as Fibre Channel and ATAPI.

The latest generation of the implementation of SAM is serial attached SCSI (SAS), succeeding over Ultra 320 parallel SCSI. SAS eliminated parallel bus issues such as multidrop, skew, limited distance, small form factor, and introduced some of the well defined advantages of using a high speed serial point-to-point link, such as elimination of skew and cross talk, fewer wires, low power etc. SAS also became the unifying point of the two dominant disk command protocols of our time, SCSI and Advanced Technology attachment (ATA), where SAS protocol ensured that SATA drives could be operated in a SAS domain.

SAS also addressed certain other deficiencies of SCSI implementation, an important one being the maximum number of devices that can be connected to form a SCSI domain, by introducing a different device addressing scheme and a routing scheme. The maximum number of devices in a SCSI domain, which used to be 16 in parallel SCSI and 127 in Fibre Channel, has grown out of proportion in SAS, to well over a thousand devices as a theoretical maximum. This property coupled with the point-to-point nature in SAS links, gave rise to the concept of expanders in SAS.

As the name implies, expanders typically increase the number of devices that can be physically connected to a SAS domain. Most SAS host bus adapters found in the market today contain 4 or 8 physical links ("phys"), limiting the number of devices that can be connected to them directly to 4 or 8 respectively. But with the help of expander, which can contain, for example, 12 or 24 or 36 phys, and their ability to be deeply cascaded, an extremely large number of drives can now be connected to a storage server. SAS also brings the added degree of resilience by allowing more than one phy in a wide port configuration to connect expanders to expander or expanders to host bus adapters. In such a connection, e.g., 4 phys wide, even if 3 phys fail, the remaining phy can still provide access to all of the devices downstream of that connection.

The presence of multiple SAS expanders containing system enclosure services (SES) processors presents the problem of having to synchronize the states of the firmware in both expanders to present a uniform view of the enclosure to the external world. The "state" of firmware, or state information, in each expander can include, for example, data needed to form SAS addresses to SATA drives, data read from sensors, and data needed to serve certain diagnostic pages as defined by the SES specification. Current solutions of SAS based appliances use an Inter-Integrated Circuit (I2C) connection between the expanders to allow them to communicate among themselves. I2C connections, however, are known for failures and hang-ups, preventing any kind of communication from taking place between the devices. Although certain precautions can be taken to minimize the possibility of an appliance failing in the case of a failure of the I2C connection, there is no conventional method known that can be used to enable expanders to communicate with each other to synchronize their state upon such failure.

SUMMARY OF INVENTION

An apparatus and method for detecting an interface failure of a first interface of a first expander of a storage system, and retrieving state information from a second expander to the first expander using a second interface of the first expander when the interface failure of the first interface is detected, is described herein. The state information is normally available to the first expander through the first interface, but is unavailable through the first interface due to the interface failure of the first interface.

BRIEF DESCRIPTION OF THE DRAWINGS

The present invention is illustrated by way of example, and not by way of limitation, in the figures of the accompanying drawings.

DETAILED DESCRIPTION

Figure 1:
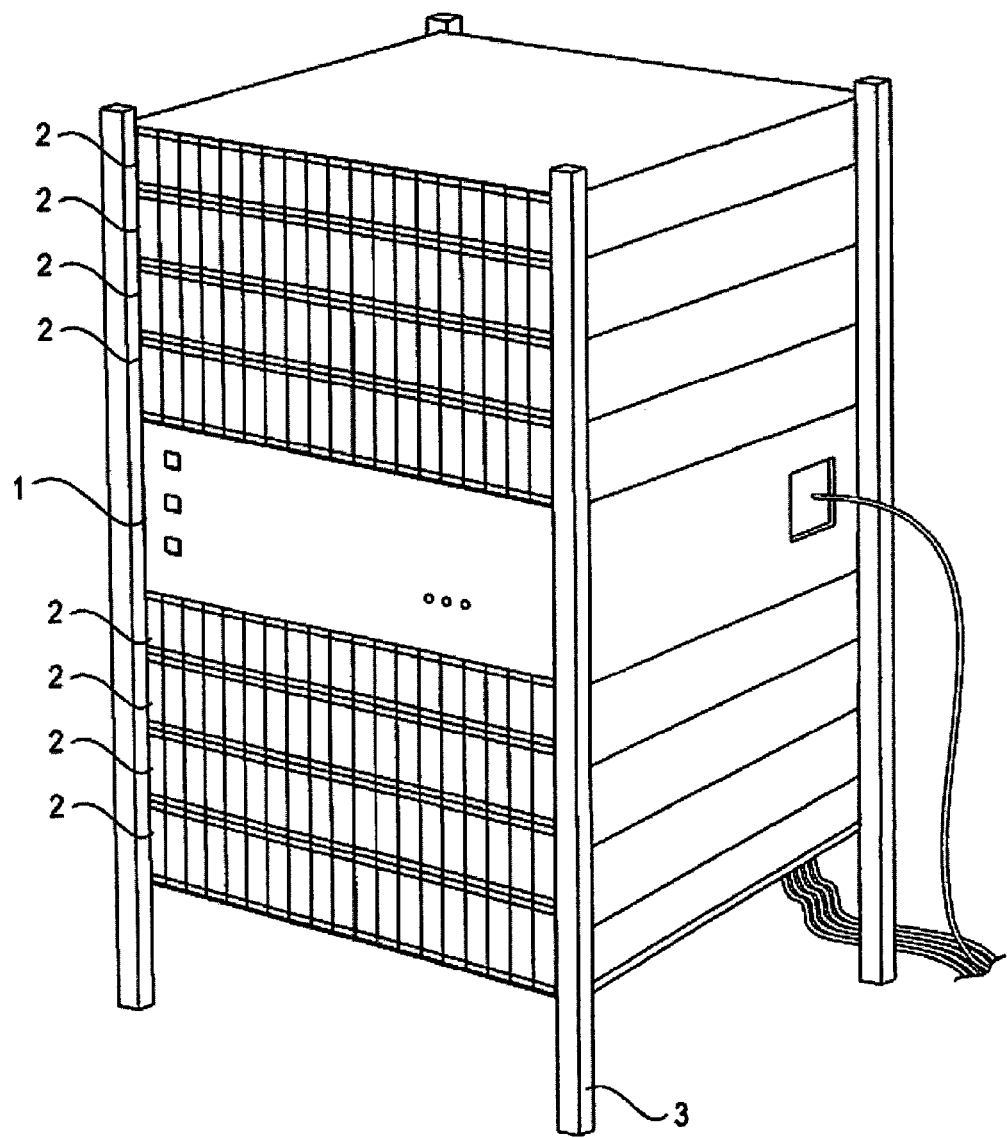
FIG. 1 illustrates a portion of a "rack and stack" (modular) file server system.

An apparatus and method for retrieving state information for a first expander from a second expander upon detecting an interface failure between the first expander and a backplane is described herein. The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

As described in detail below, the apparatus may include first and second expanders of a storage system. The first expander has two interfaces; a first interface that is configured to retrieve state information of the storage system for the first expander, and a second interface that is configured to retrieve the state information from the second expander to the first expander when an interface failure of the first interface of the first expander has been detected. The state information is available to the first expander through the first interface, but is unavailable through the first interface due to the interface failure of the first interface. As described in detail with exemplary embodiments below, the two expanders may be implemented each in either two storage server heads of an all-in-one storage system, or two IO modules of a modular storage system.

SAS technology can be implemented in either JBODs or in storage servers, such as filers. A JBOD can have e.g., 24 drives in a shelf and two IO modules, each of which includes a SAS expander and a set of associated electronics. A storage server version may be a PC platform with a SAS controller and a SAS expander in each head, among other circuits, e.g., processors or the like.

In order to increase the competitiveness in the market place, SAS expander vendors have incorporated SES processors, into expanders. SES is a well defined entity in SAM. These SES processors can be used to monitor and control the environment in the enclosure. This is achieved by monitoring and controlling various enclosure components, such as power supplies, voltage and current sensors, fans, disk, dongles, light emitting diodes (LEDs), etc.

Given that SATA drives are to be operated in a SAS domain, the SATA drives are presented as SCSI or SAS drives to upper layer software. Typically this is done in SAS host bus adapter firmware, but it can also be done at an operating system driver level as well. One aspect of such emulation would be to generate a unique SAS address for SATA drives. Some SATA drives provided a worldwide name (WWN), but some did not. In order to maintain consistency, the SAS protocol made it compulsory for expanders as well as host bus adapters to generate a WWN for each SATA device if such a device is directly connected to them. For storage appliances such as filers and JBODs, where there may be multiple expanders to a given set of drives in a single enclosure, it became necessary to generate WWNs in a uniform consistent fashion, so that the operating system would see the same WWN, no matter which expander is being used to connect to a particular SATA drive. One way of achieving this was to place a serial EEPROM, or the like, in the backplane of the enclosure containing some enclosure-specific data, which would be used by both expanders to generate consistent WWNs. Accordingly, both expanders should be able to see a consistent view of the contents of the backplane EEPROM.

As previously mentioned, SAS is the next generation IO interconnect that succeeded the parallel SCSI architecture. It is also a unifying effort where SATA drives can now be operated in a SAS domain. SAS based appliances may include SAS based JBODs or embedded filers. In both appliances, there may be multiple SAS expanders in a single enclosure. Each expander will reside in an IO module or a storage server head. These expanders are connected through a backplane of the enclosure using I2C busses to synchronize their internal states. As previously mentioned, I2C busses are known to be susceptible to different kinds of failures. Described herein, therefore, are embodiments of an apparatus and method for synchronizing the expander states, when an I2C bus or other interconnect between SAS expanders fails, thereby eliminating another potential point of failure.

SAS preserves useful features that were available in parallel SCSI. SES and SAS, however, define new enhancements to these useful features, making it possible to define new mechanisms to solve the problem described above. In one embodiment of the invention, an expander that detects an interface failure (e.g., I2C failure) uses the BROADCAST (SES) functionality, described in the SAS specification, in conjunction with event reporting mechanism, defined by SAS HBA vendors used in a HA filer environment, to reduce the dependency of I2C and similar busses in SAS expanders to communicate with devices such as EEPROMS, temperature and voltage sensors, drive dongles. A drive dongle may be a physical device, attached to (e.g., plugs into or "hangs" from) an I/O port of the backplane, that adds hardware capabilities, such as signal conversion for different types of connectors, adapter capabilities (e.g., USB adapter for such devices as memory cards), storage capabilities (e.g., flash memory drives or the like), etc. Alternatively, the drive dongles, for example, may act as copy protection for a particular software application, or as a hardware key. The BROADCAST(SES) is a BROADCAST primitive that is a notification of an asynchronous event from a logical unit with a peripheral device type (i.e., enclosure services device) in the SAS domain.

In one embodiment, the method may be performed by defining a new communication process that starts with the expander firmware module issuing a BROADCAST(SES) primitive that gets transmitted to a SAS HBA, which in turn converts the primitive into an event sent to the SAS driver, which then sends the event to the SES driver using an operating system signal. There are a number of possibilities from that point onwards to either communicate with the partner expander using the cluster interconnect, or query the expander SES module and take required actions, such as when certain inconsistencies arise in the expander firmware state.

Exemplary embodiments of the present invention, as described herein, provide a robust method for synchronizing the state of two or more expanders using infrastructure and protocols, and thereby, improving the reliability of the total solution.

Figure 2:
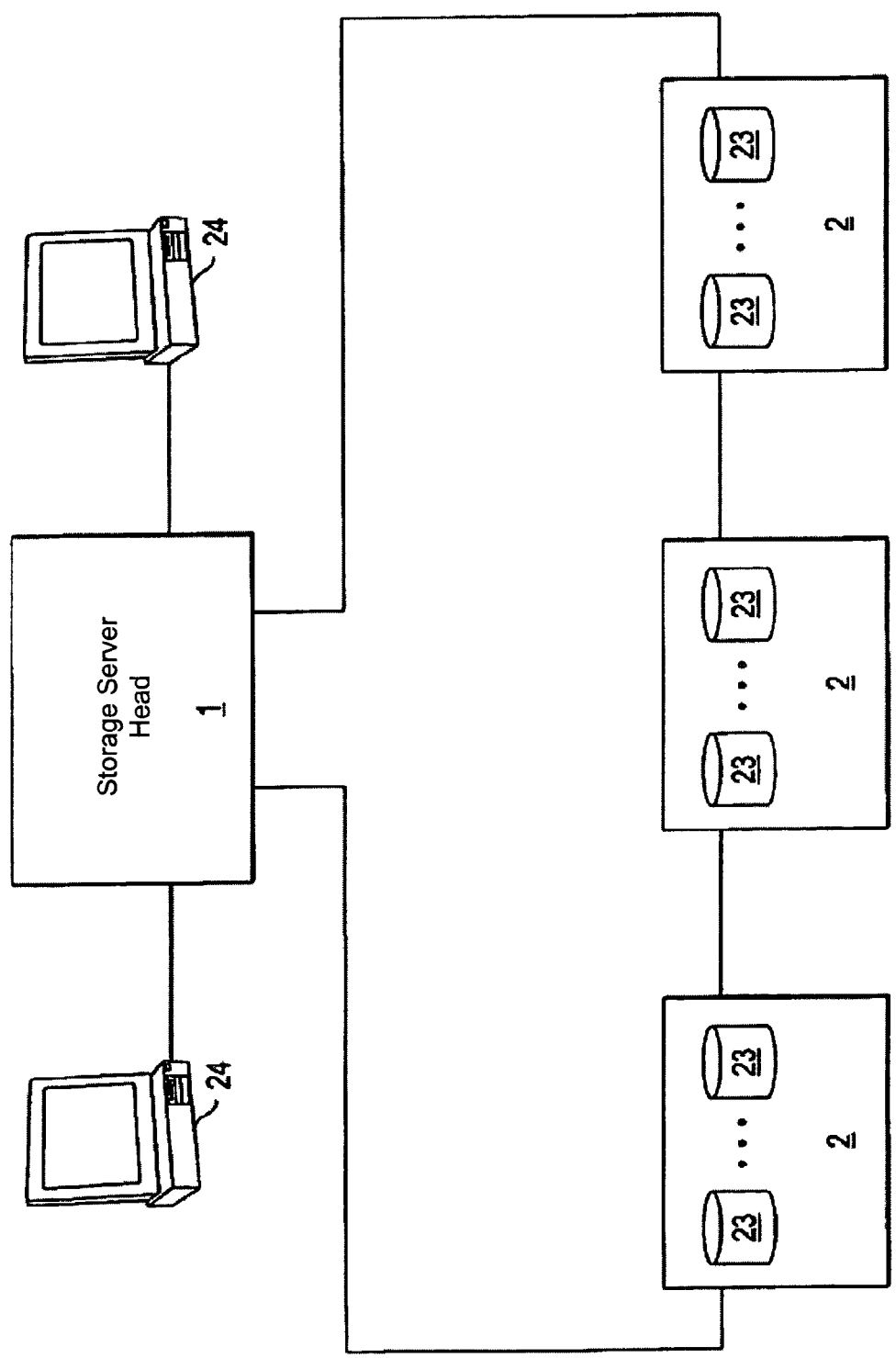
FIG. 2 illustrates a block diagram of one embodiment of a modular file server system.

FIG. 2 illustrates a block diagram of one embodiment of a modular type file server system such as mentioned above. A modular file server storage server head 1 is contained within its own enclosure and is connected to a number of the external disk drive shelves 2 in a loop configuration. Each shelf 2 contains multiple disk drives 23 operated under control of the storage server head 1 according to RAID protocols. The file server storage server head 1 provides a number of clients 24 with access to shared files stored in the disk drives 23. Note that FIG. 2 shows a simple network configuration characterized by a single loop with three shelves 2 in it; however, other network configurations are possible. For example, there can be a greater or smaller number of shelves 2 in the loop; there can be more than one loop attached to the storage server head 1; or, there can even be one loop for every shelf 2.

Figure 3:
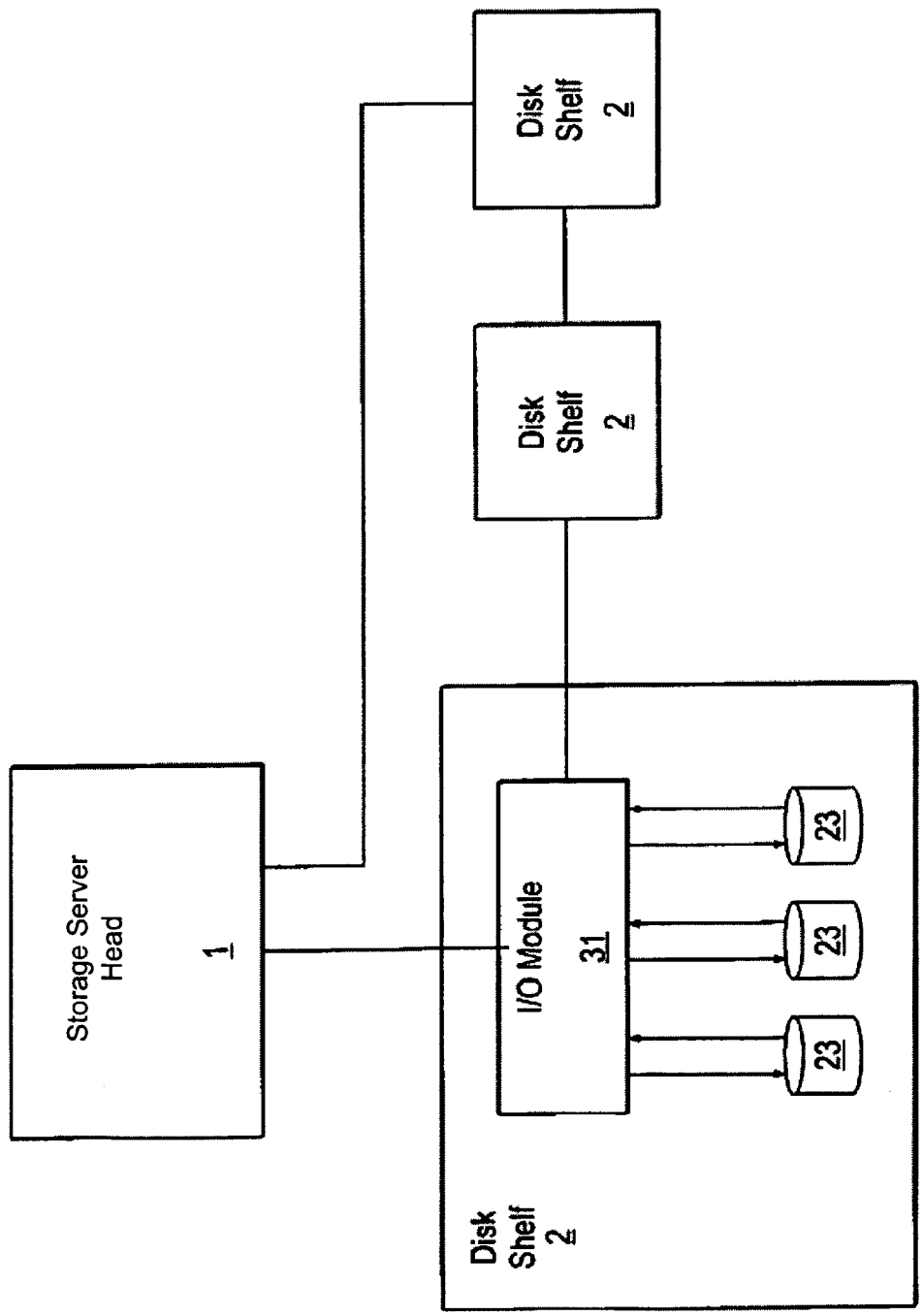
FIG. 3 illustrates in greater detail a disk drive shelf of the file server system of FIG. 2.

FIG. 3 illustrates in greater detail a disk drive (JBOD) shelf 2 of the type shown in FIGS. 1 and 2 (the clients 24 are not shown). Each of the shelves 2 can be assumed to have the same construction. Each shelf 2 includes multiple disk drives 23. Each shelf also includes at least one I/O module 31, which is connected between the shelf 2 and the next shelf 2 in the loop and in some cases (depending on where the shelf 2 is placed in the loop) to the storage server head 1. The I/O module 31 is a communications interface between the storage server head 1 and the disk drives 23 in the shelf 2. The functionality of the I/O module 31 is described further below. The disk drives 23 in the shelf 2 can be connected to the I/O module 31 by a standard Fibre Channel connection. Alternatively, the disk drives 23 can be connected to the I/O module 31 by other connection types.

The use of RAID protocols between the storage server head 1 and the shelves 2 enhances the reliability/integrity of data storage through the redundant writing of data "stripes" across physical disks 23 in a RAID group and the appropriate writing of parity information with respect to the striped data. In addition to acting as a communications interface between the storage server head 1 and the disk drives 23, the I/O module 31 also serves to enhance reliability by providing loop resiliency. Specifically, if a particular disk drive 23 within a shelf 2 is removed, the I/O module 31 in that shelf 2 simply bypasses the missing disk drive and connects to the next disk drive within the shelf 2. This functionality maintains connectivity of the loop in the presence of disk drive removals and is provided by multiple Loop Resiliency Circuits (LRCs) (not shown) included within the I/O module 31. In at least one embodiment, the LRCs are implemented in the form of port bypass circuits (PBCs) within the I/O module 31 (typically, a separate PBC for each disk drive 23 in the shelf 2). Note that a PBC is only one implementation of an LRC. Other ways to implement an LRC include a hub or a switch. The implementation details of I/O modules and PBCs such as described here are well known in the relevant art and are not needed to understand the present invention.

As mentioned above, access to data in a file server system is controlled by a file server head, such as storage server head 1 in the above-described figures. Also as described above, in a modular file server system the storage server head 1 is contained within its own chassis and is connected to one or more external JBOD disk shelves 2 in their own respective chassis.

Figure 4:
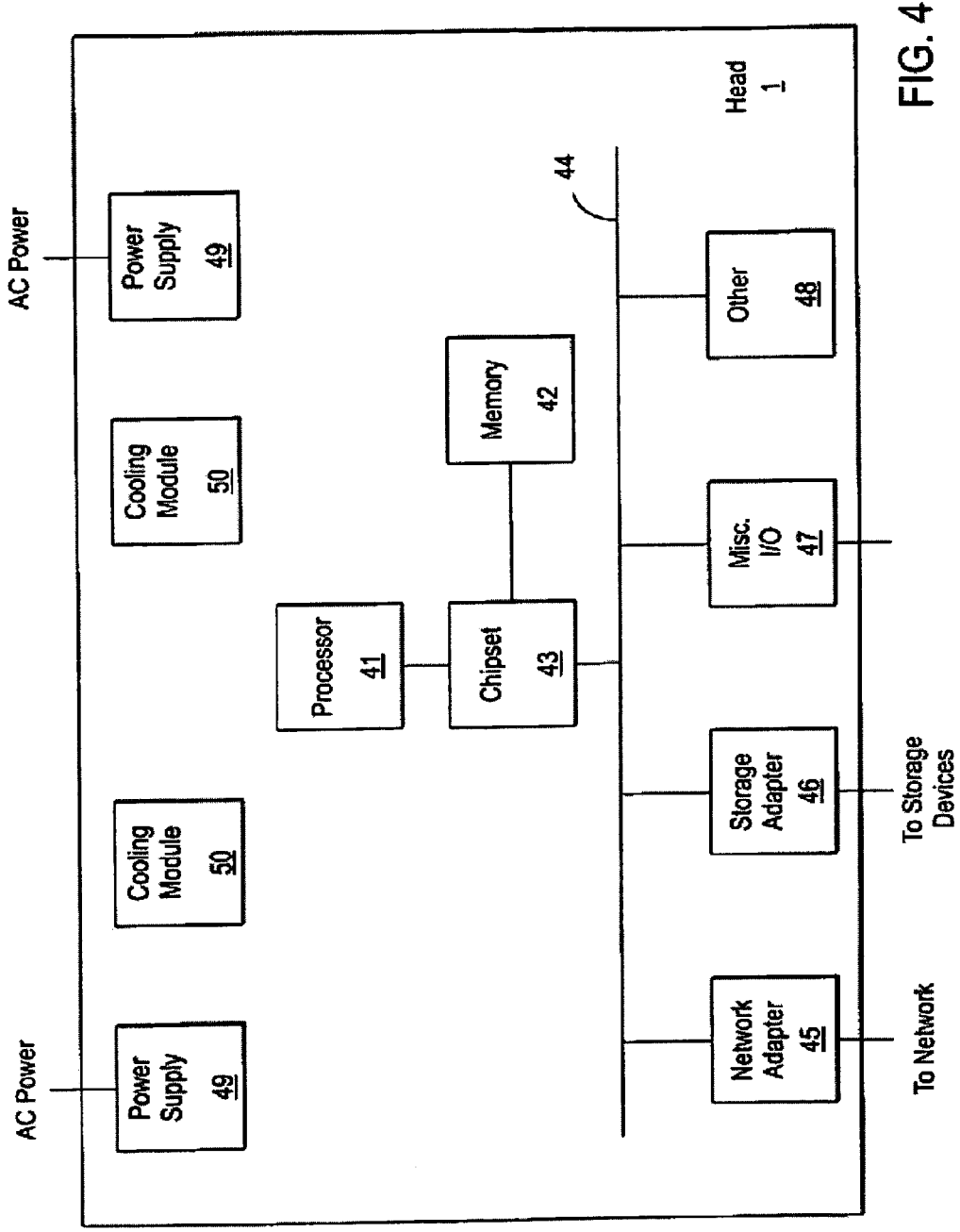
FIG. 4 illustrates a block diagram of one embodiment of a file server head.

FIG. 4 illustrates a block diagram of such a file server storage server head 1, according to certain embodiments. As shown, the storage server head 1 includes a processor 41, memory 42, and a chipset 43 connecting the processor 41 to the memory 42. The chipset 43 also connects a peripheral bus 44 to the processor 41 and memory 42. Also connected to the peripheral bus 44 are one or more network adapters 45, one or more storage adapters 46, one or more miscellaneous I/O components 47, and in some embodiments, one or more other peripheral components 48. The storage server head 1 also includes one or more power supplies 49 and one or more cooling modules 50 (preferably at least two of each for redundancy).

The processor 41 is the central processing unit (CPU) of the storage server head 1 and may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. The memory 42 may be or include any combination of random access memory (RAM), read-only memory (ROM) (which may be programmable) and/or Flash memory or the like. The chipset 43 may include, for example, one or more bus controllers, bridges, and/or adapters. The peripheral bus 44 may be, for example, a Peripheral Component Interconnect (PCI) bus, a Hyper-Transport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire"). Each network adapter 45 provides the storage server head 1 with the ability to communicate with remote devices, such as clients 24 in FIG. 2, and may be, for example, an Ethernet adapter. Each storage adapter 46 allows the storage server head 1 to access the external disk drives 23 in the various shelves 2 and may be, for example, a Fibre Channel adapter.

Expanders

Figure 5A:
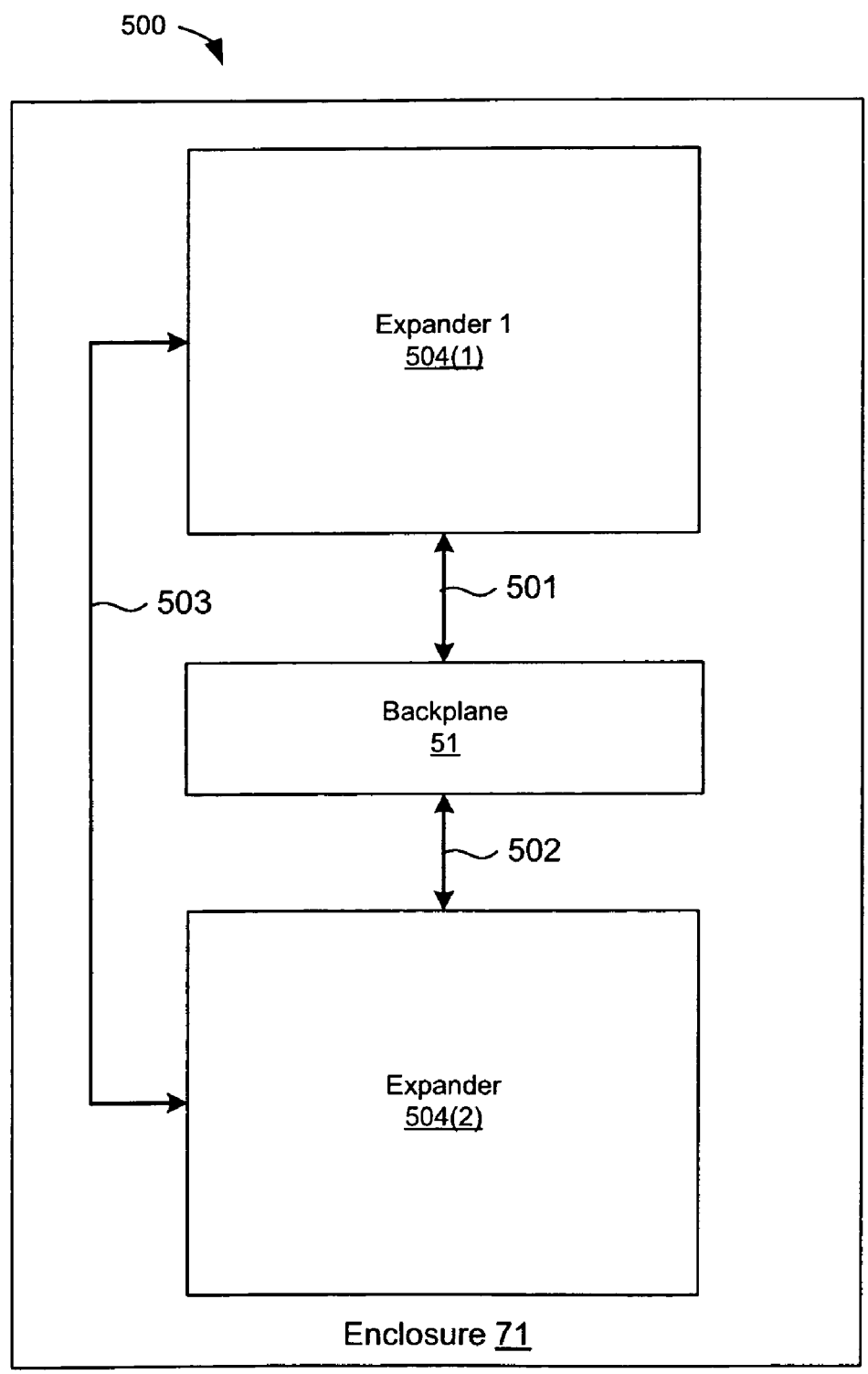
FIG. 5A illustrates a block diagram of one embodiment of a storage system, which has two expanders coupled to a backplane of an enclosure.

FIG. 5A illustrates a block diagram of one embodiment of a storage system 500, which has two expanders 504(1) and 504(2) coupled to a backplane 51 of an enclosure 71 (other components which are not germane to this explanation are not shown). In this embodiment, the storage system 500 includes two expanders, expander 504(1) and expander 504(2). Expander 504(1) is coupled to the backplane 51 through interface 501. Similarly, expander 504(2) is coupled to the backplane 51 through interface 502. Expander 504(1) and expander 504(2) are coupled together through interface 503. Interfaces 501, 502, and 503 may be I2C interconnects. Alternatively, other interfaces known by those of ordinary skill in the art may be used. It should also be noted that although interface 503 is illustrated as being directly coupled between expander 504(1) and expander 504(2), the storage system may include other components that are used within the communication path of interface 503 to communicate information to and from each expander.

Figure 5B:
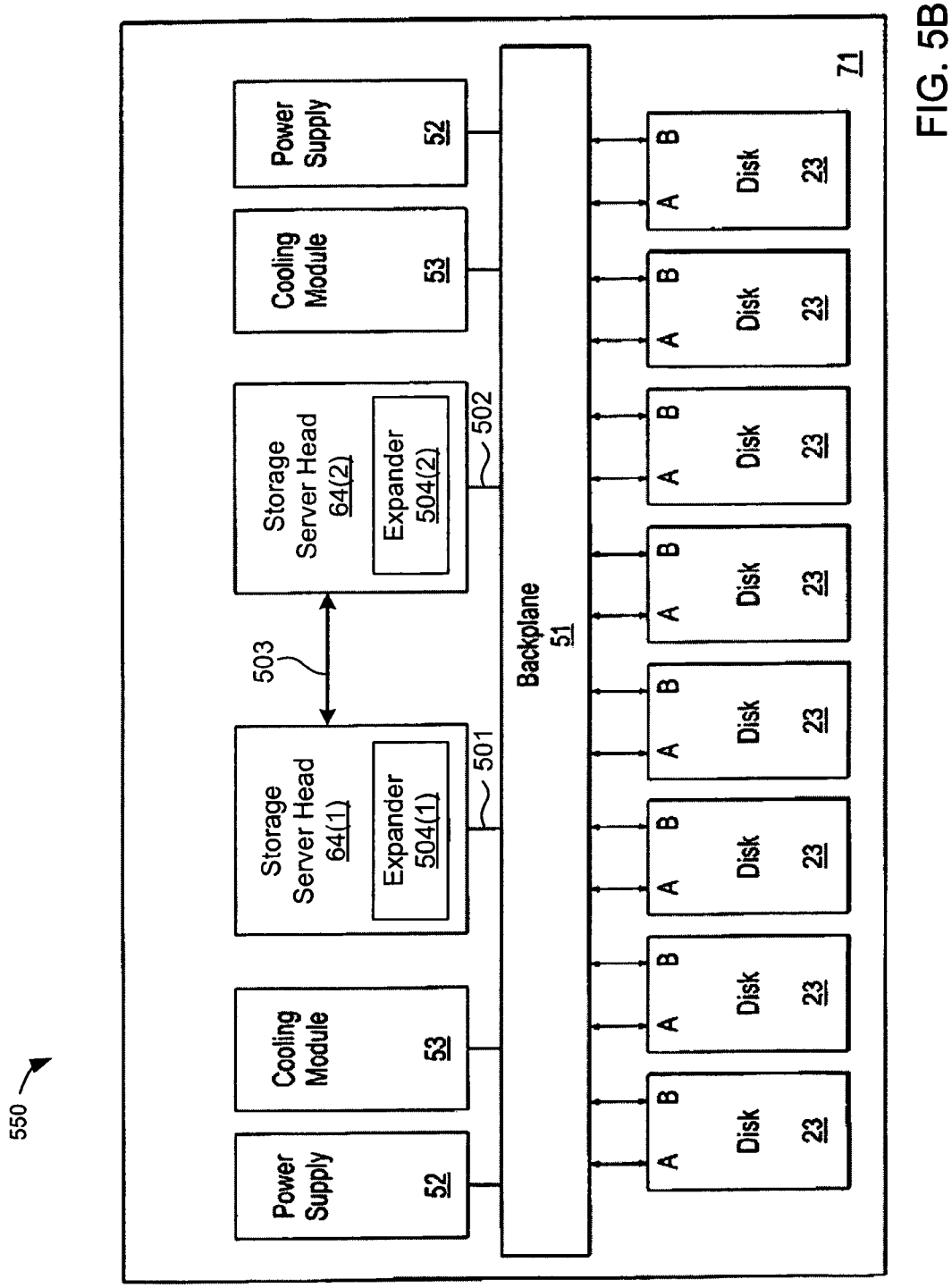
FIG. 5B illustrates a block diagram of one embodiment of a storage system, which has two storage server heads coupled to a backplane of an enclosure.
Figure 5C:
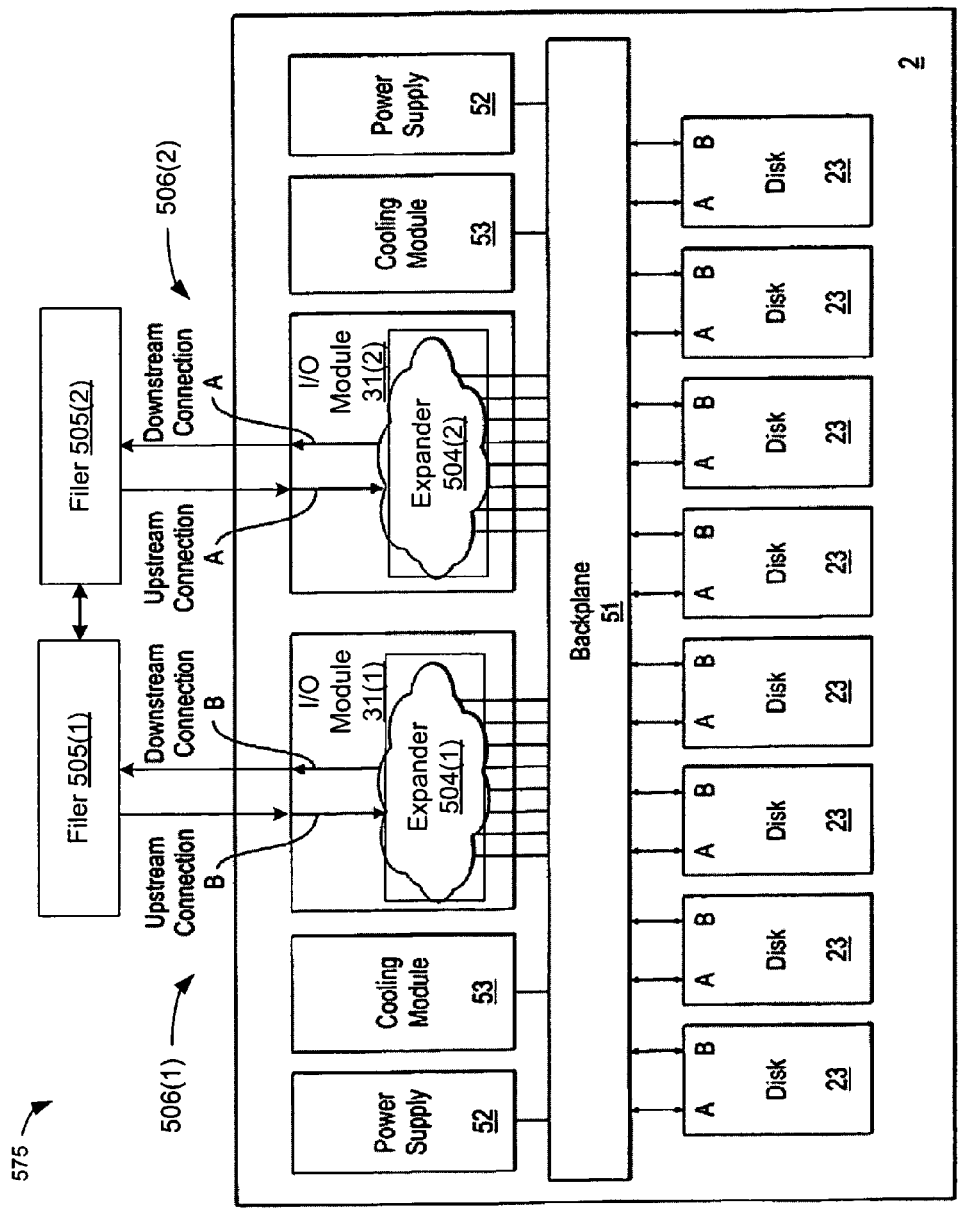
FIG. 5C illustrates a block diagram of one embodiment of a JBOD storage shelf, which has two expanders implemented within two IO modules.
Figure 6A:
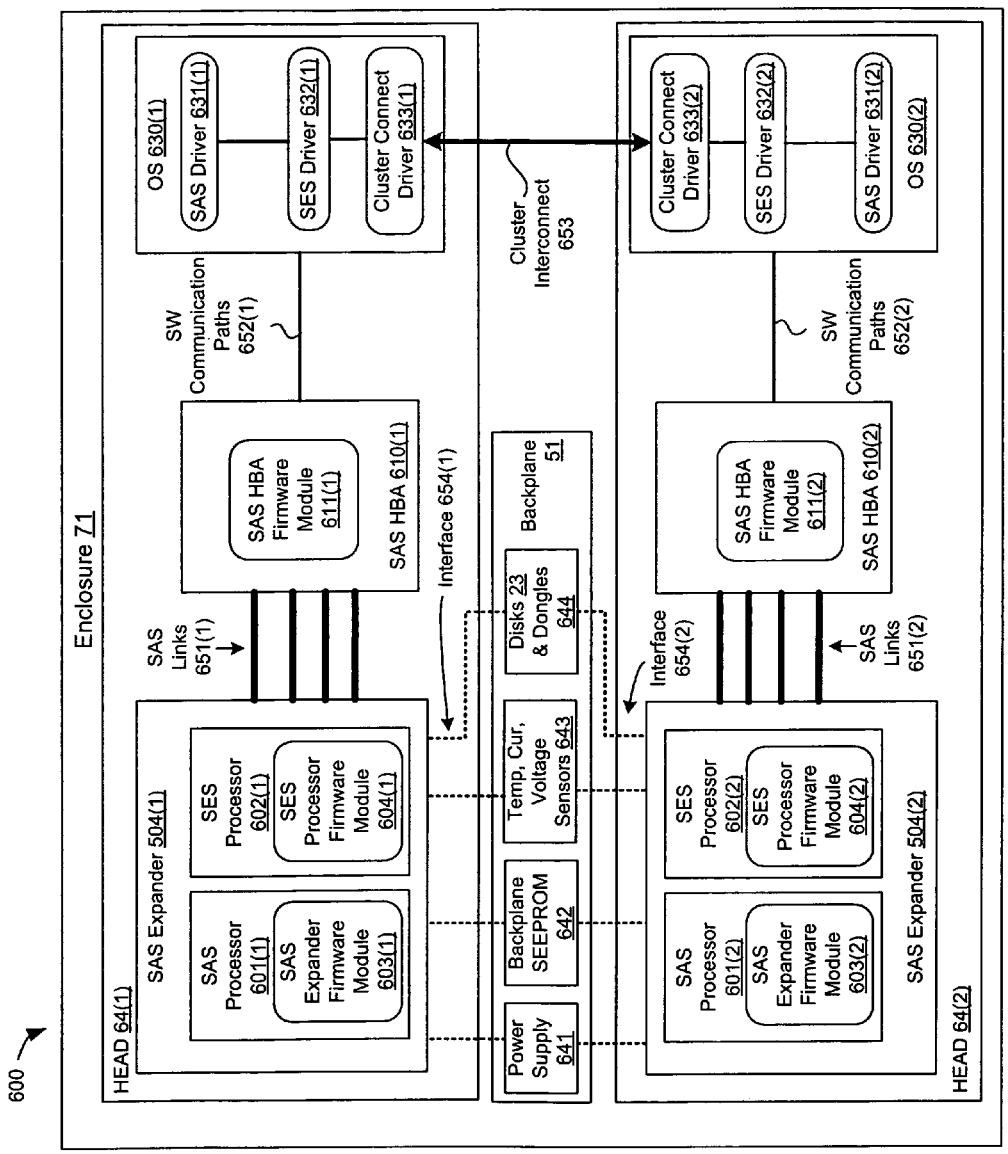
FIG. 6A illustrates a block diagram of one embodiment of two storage server heads, which each have an expander coupled to a backplane of an enclosure.
Figure 6B:
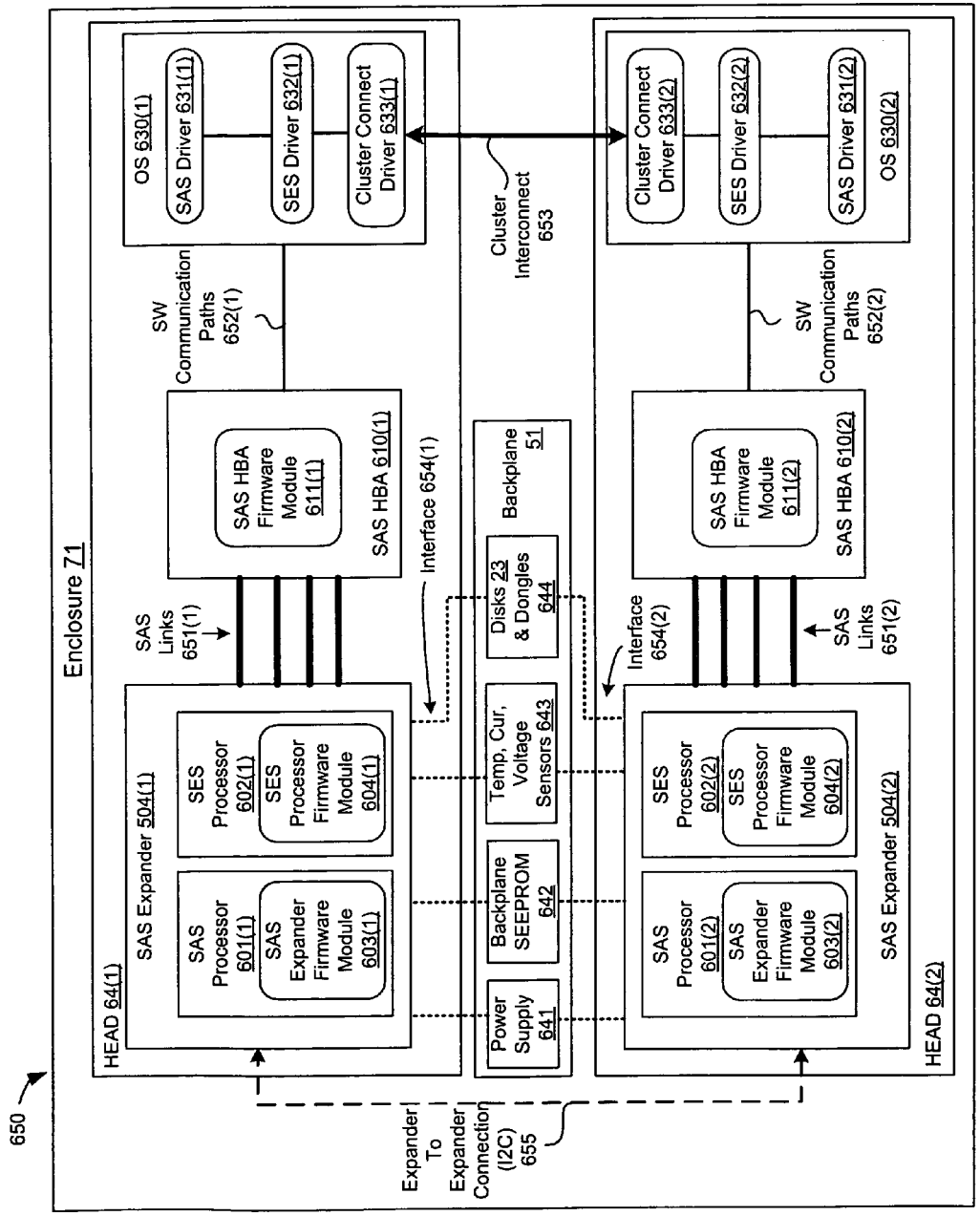
FIG. 6B illustrates a block diagram of another embodiment of two storage server heads, which each have an expander coupled to a backplane of an enclosure.
Figure 7:
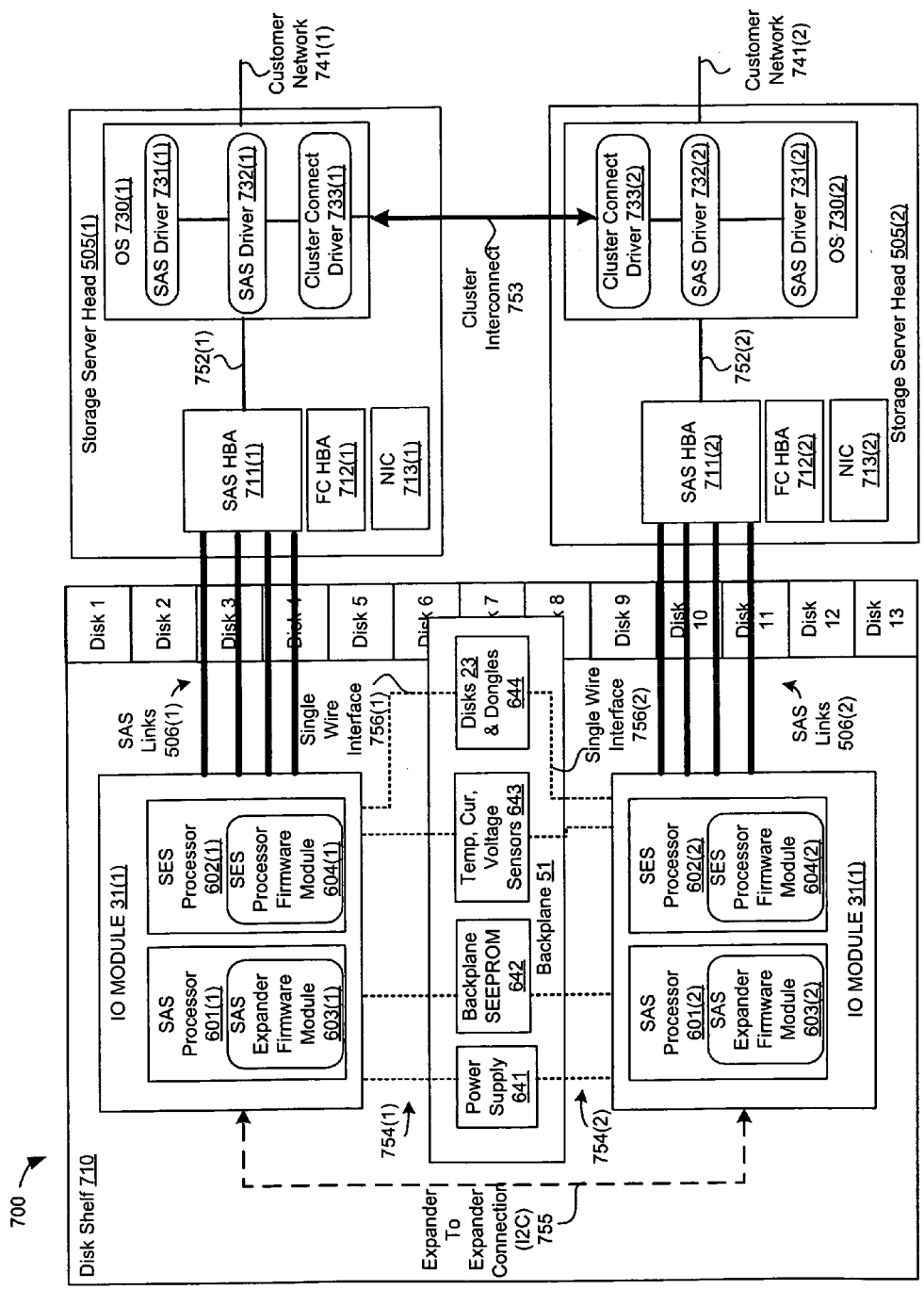
FIG. 7 illustrates a block diagram of one embodiment of a disk storage shelf having two IO modules, which each have an expander coupled to a backplane of the disk storage shelf.

Storage system 500 may be an all-in-one custom-designed system that is a computer with built-in disk drives all in a single chassis (enclosure), or a modular system in which one or more sets of disk drives, each in a separate chassis, are connected to an external file server "head" in another chassis. In one embodiment, the two expanders may each be implemented within a storage server head of a single enclosure, as illustrated in FIGS. 5B, 6A, and 6B. Alternatively, the two expanders may each be implemented within IO modules of a single enclosure that are coupled to two storage server heads that are external to the single enclosure in one or more separate enclosures, as illustrated in FIGS. 5C, and 7.

It should be noted that two or more storage server heads, whether implemented in the same or separate enclosures, may provide cluster failover (CFO) capability (i.e., redundancy). CFO refers to a capability in which two or more interconnected heads are both active at the same time, such that if one head fails or is taken out of service, that condition is immediately detected by the other head, which automatically assumes the functionality of the inoperative head as well as continuing to service its own client requests. In certain embodiments, the two or more storage server heads 64 communicate with each other via the backplane 51, and interfaces 501 and 502, using Gigabit Ethernet protocol, as illustrated below in FIG. 5B. Alternatively, the two or more storage server heads 64 may communicate with each other via a third interface 503, also as illustrated in FIG. 5B. Backplane 51 is used to connect multiple disks (e.g., disks 23) of the enclosure 71 to the two expanders 504(1) and 504(2). The backplane may be, for example, a circuit board (usually a printed circuit board) that connects several connectors of separate devices to each other. For example, the pins of each connector may be linked to the same relative pin of all the other connectors, forming a computer bus. The backplane may be either passive or active. Passive backplanes may offer no active bus driving circuitry, while active backplanes may include circuitry that buffers the various signals to the different devices. Note that in other embodiments, protocols other than Ethernet may be used for communication between the heads 64, such as I2C protocols. In another embodiment, the two or more expanders 504(1) and 504(2) of the two IO modules 31(1) and 31(2) communicate with each other via the backplane 51, and interfaces 501 and 502, using Gigabit Ethernet protocol, as illustrated below in FIG. 5C. Alternatively, the two or more expanders 504(1) and 504(2) may communicate with each other via a third interface 503, also as illustrated in FIG. 5C. Note that in other embodiments, protocols other than Ethernet may be used for communication between the expanders 504(1) and 504(2), such as I2C protocols.

FIG. 5B illustrates a block diagram of one embodiment of all-in-one storage system 500, which has two storage server heads 64(1) and 64(2) coupled to backplane 51 of an enclosure 71. All-in-one storage system 500 includes two storage server heads 64(1) and 64(2). Storage server head 64(1) includes expander 504(1). Storage server head 64(2) includes expander 504(2). Connected to the backplane 51 in the storage system 500 of FIG. 5B are several individual disk drives 23, redundant power supplies 52 and associated cooling modules 53 (which may be substantially similar to power supplies 49 and cooling modules 50, respectively, in FIG. 4), and two storage server heads of the type described above. Backplane 51 may also be coupled to other external components, such as voltage, current, temperature sensors, dongles, LEDs, fans, or the like.

Connecting the heads 64(1) and 64(2) to the backplane 51 may be advantageous, because, among other reasons, it eliminates the need for cables or wires to connect the heads 64(1) and 64(2). Note that although two heads 64 are shown in FIG. 5B, the storage system 500 can operate as a standalone system with only one head 64, or alternatively, with more heads than two. Each storage server head may contain the electronics, firmware and software along with built-in I/O connections to allow the enclosure to be used as a NAS file server and/or a SAN storage system. The circuit board of each storage server head has various conventional electronic components (processor, memory, communication interfaces, etc.) mounted and interconnected on it. In one embodiment, the head can be distributed between two or more circuit boards, although a single-board head is believed to be advantageous from the perspective of conserving space inside the chassis.

This standalone system 500 can be easily grown in capacity and/or performance by combining it with additional modular storage shelves (as illustrated in FIG. 5C) and (optionally) with a separate, more powerful file server head. This approach provides scalability and upgradeability with minimum effort required by the user. In addition, this approach allows the user to add more performance or capacity to his system without physically moving disk drives from the original enclosure or having to copy the data from the original machine to the newer machine.

FIG. 5C illustrates a block diagram of one embodiment of a modular storage system 575, which has two expanders implemented within two IO modules of a JBOD disk drive shelf 2. The block diagram is substantially the same as that of FIG. 5B, except that each of the storage server heads 504(1) and 504(2) have been replaced in the disk enclosure by I/O modules 31(1) and 31(2), respectively, connected to the backplane 51, and the heads are now external to the disk enclosure. As described above, the I/O modules 31 provide a communications interface between external storage server heads 505(1) and 505(2) and the disk drives 23, including providing loop resiliency for purposes of accessing the disk drives 23. In particular, the two storage server heads 505(1) and 505(2) communicate with the backplane 51 using IO modules 31(1) and 31(2) and interfaces 506(1) and 506(2). The interfaces 506(1) and 506(2) may have upstream and downstream connections. The two storage server heads 505(1) and 505(2) may communicate with each other through the IO modules and the backplane, or alternatively, through interface 506(3). The IO modules 31(1) and 31(2) may communicate with the backplane 51 using interfaces 501 and 502, respectively. The expanders 504(1) and 504(2) may communicate with each other via the backplane 51, and interfaces 501 and 502, using Gigabit Ethernet protocol. Alternatively, the two expanders 504(1) and 504(2) may communicate with each other via a third interface 503. Note that in other embodiments, protocols other than Ethernet may be used for communication between the expanders 504(1) and 504(2), such as I2C protocols.

JBOD disk drive shelf 2 is of the type which may be connected to separate (external) heads in a modular file server system, such as storage server heads 505(1) and 505(2). All of the illustrated components, except the storage server heads 505(1) and 505(2), are contained within a single chassis (enclosure). The storage server heads 505(1) and 505(2) may be contained within one or more separate chassis (enclosures). As shown, all of the major components of the shelf 2 are connected to, and communicate via, a backplane 51. The backplane 51 can be "passive," having no active electronic circuitry mounted on or in it. A passive backplane is a passive communications medium that does not include any bus driving circuitry for buffering various signals (e.g., bus communications) between the different devices. Alternatively, backplane 51 may include active electronic circuitry mounted on it, such as memory, memory controllers, sensors, bus driving circuitry for buffering various signals between the different devices, or the like. The backplane 51 can be comprised of one or more substantially planar substrate layers (which may be conductive or which may be dielectric with conductive traces disposed on/in it), with various pin-and-socket type connectors mounted on it to allow connection to other components in the shelf 2.

FIG. 6A illustrates a block diagram of one embodiment of a storage system 600 that includes two storage server heads 64(1) and 64(2), which each have an expander coupled to a backplane 51 of an enclosure 71. Storage system 600 includes two storage server heads, head 64(1) and head 64(2), and backplane 51. Head 64(1) includes SAS expander 504(1), SAS host bus adapter (HBA) 610(1), and operating system 630(1). SAS expander 504(1) includes SAS processor 601(1), which includes SAS expander firmware module 603(1), and SES processor 602(1), which includes SES processor firmware module 604(1). The SAS expander firmware module 603(1) is configured to detect an interface failure on the interface 654(1) between the SAS expander 504(1) and backplane 51, and to retrieve information from another expander (e.g., residing in another storage server head), such as expander 504(2). The interface 654(1) includes communication channels that may be I2C interconnects, or alternatively, other types of interface interconnects.

The SAS expander 504(1) is coupled to the SAS HBA 610(1) through another interface 651(1). In this embodiment, this interface includes four SAS links. Alternatively, other interfaces may be used. SAS HBA 610(1) includes a firmware module, SAS HBA firmware module 611(1).

Operating system 630(1) includes one or more drivers. For example, OS 630(1) includes SAS driver 631(1), SES driver 632(1), and cluster connect driver 633(1). The SAS HBA may communicate with the OS via software communication paths. These software communication paths are illustrated in FIG. 7 as communication paths 652(1).

Storage server head 64(2) includes the same components as storage server head 64(1), namely, a SAS expander 504(2), SAS HBA 611(2), and OS 630(2). These components are identical, or similar to those of storage server head 64(1), except that they reference numbers have been designated with (2) for ease of discussion.

Coupled to both the storage server heads 64(1) and 64(2) is backplane 51. Backplane 51 may include (or be coupled to) other components, such as power supply 641, backplane serial EEPROM 642, temperature, current, voltage sensors 643, disks 23 and dongles 644. The storage server heads 64(1) and 64(2) are coupled to the backplane through two interfaces 654(1) and 654(2), respectively, which each include communication channels. The communication channels may be used by the heads to retrieve state information from the components of the backplane 51. As previously mentioned, in one embodiment, the communication channels may be I2C interconnects. Alternatively, other interconnects may be used.

Storage server heads 64(1) and 64(2) are also coupled together through cluster interconnect 653. Cluster interconnect 653 may be an Infiniband interconnect, for example. Alternatively, cluster interconnect 653 may be an SAS interconnect, Ethernet interconnect, or the like.

FIG. 6B illustrates a block diagram of one embodiment of storage system 650 that includes two expanders coupled together by an additional interface. Storage system 650 includes two storage server heads, head 64(1) and head 64(2), and backplane 51. The components of storage system 650 are the identical to, or the same as, those of FIG. 6A. However, in this embodiment, the SAS expander 504(1) and SAS expander 504(2) are coupled together using an additional interface, interface 655. Interface 655 may be an expander-to-expander direct connection, such as an I2C interconnect, for example. Alternatively, the interface 655 may include OS or cluster connect drivers to facilitate the communication, and may be another type of interconnect, such as Ethernet, or the like.

FIG. 7 illustrates a block diagram of one embodiment of a modular storage system 700 that includes a disk storage shelf 710 having two IO modules 31(1) and 31(2), which each have an expander (coupled to a backplane of the disk storage shelf). Storage system 700 include a disk storage shelf 710 having two IO modules 31(1) and 31(2) and backplane 51, and two external storage server heads 505(1) and 505(2). As previously mentioned, a storage system may be all-in-one custom-designed system that is a standard computer with built-in disk drives all in a single chassis (enclosure), or it may be a modular system in which one or more sets of disk drives, each in a separate chassis, are connected to an external file server "head" in another chassis. In this embodiment, disk storage shelf 710 is in one enclosure, and the two external storage server heads 505(1) and 505(2) are in separate enclosure(s) from the enclosure of the disk storage shelf 710.

The two IO modules 31(1) and 31(2) include two expanders and a set of associated electronics. These expanders may be identical or similar to expanders 504(1) and 504(2) described with respect to FIGS. 6A and 6B. The IO module 31(1) includes SAS processor 601(1), which has SAS expander firmware module 603(1), and SES processor 602

(1), which has SES processor firmware module 604(1). The SAS expander firmware module 603(1) is configured to detect an interface failure on the interface between the SAS expander 504(1) and backplane 51, and to retrieve state information from another expander (e.g., residing in another storage server head).

Similar to the interface between the expanders 504(1) and 504(2) and backplane 51, IO modules 31(1) and 31(2) are coupled to the backplane through two interfaces, interfaces 754(1) and 754(2), respectively, which each include communication channels. Interface 654(1) may include I2C interconnects, or alternatively, other types of interface interconnects.

The IO module 31(1) is coupled to the SAS HBA 711(1) through another interface. In this embodiment, this interface includes four SAS links 506(1). Alternatively, other interfaces may be used. SAS HBA 711 may include a firmware module, much like SAS HBA firmware module 611(1).

Storage server heads 505(1) and 505(2) both include an operating system. An exemplary operating system that can operate on a storage server heads is Data ONTAP®, commercially available from Network Appliance, of Sunnyvale, Calif. The OS 730(1) and OS 730(2) may be, or similar to, the two operating systems of the storage server heads 64(1) and 64(2), as described with respect to FIGS. 6A & 6B. Accordingly, OS 730(1) includes SAS driver 731(1), SES driver 732(1), and cluster connect driver 733(1). The SAS HBA may communicate with the OS via software communication paths. These software communication paths are illustrated in FIG. 7 as communication paths 752(1).

Storage server head 505(2) includes the same components as storage server head 505(1), namely, a SAS expander, SAS HBA 711(2), and OS 730(2). These components are the same as those of storage server head 505(1), except that they reference numbers have been designated with (2) for ease of discussion. In addition to the SAS HBA, the storage server heads may include FC HBA 712, and network interface card (NIC) 713(1).

Coupled to both the IO modules 31(1) and 31(2) is backplane 51. Backplane 51 may include (or be coupled to) other components, such as power supply 641, backplane serial EEPROM 642, temperature, current, voltage sensors 643, disks 23 and dongles 644. The IO modules 31(1) and 31(2) are coupled to the backplane through two interfaces, interfaces 754(1) and 752, respectively, which each include communication channels. The communication channels may be used by the IO modules to retrieve information (e.g., state information) from the components of the backplane 51. As previously mentioned, in one embodiment, the communication channels may be I2C interconnects. Alternatively, other interconnects may be used.

Storage server heads 505(1) and 505(2) are also coupled together through cluster interconnect 753. Cluster interconnect 653 may be an Infiniband interconnect. Alternatively, cluster interconnect 753 may be an SAS interconnect, Ethernet interconnect, or the like.

In one embodiment, the IO modules are coupled to the disks using a single wire connection 756(1) and 756(2). Alternatively, the IO modules are coupled using multi wire interfaces.

It should be noted that the embodiments described in FIGS. 6A, 6B, and 6C have been described as having only two storage server heads in an HA configuration, but are not limited to having two storage server heads. The embodiments may be used in highly available systems with N number of heads.

Figure 8:
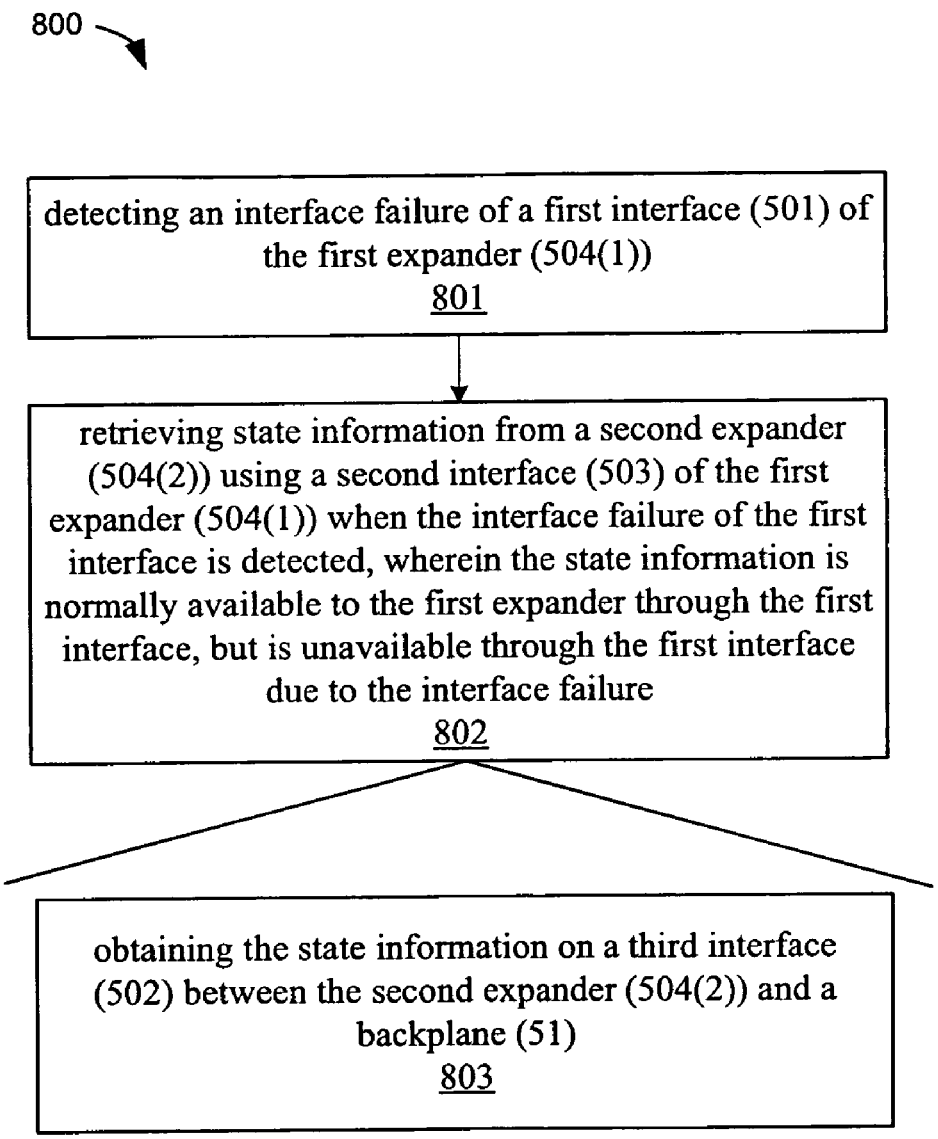
FIG. 8 illustrates a flow chart of one embodiment of a method for retrieving state information for a first expander from a second expander upon detecting an interface failure between the first expander and a backplane.

FIG. 8 illustrates a flow chart of one embodiment of a method for retrieving state information for a first expander from a second expander upon detecting an interface failure between the first expander and a backplane. The method 800 includes detecting an interface failure, further described below, of a first interface (e.g., interface 501 between a first expander 504(1)) and a backplane 51) (operation 801), and retrieving the state information from a second expander through a second interface (e.g., interface 502 between the first and second expanders 504(1) and 504(2)) (operation 802). In one embodiment, retrieving information from the second expander (e.g., 504(2)) includes retrieving the state information from the backplane (e.g., 51) through a third interface (e.g., 503) between the second expander (e.g., 504(2)) and the backplane (e.g., 51) (operation 803).

In one embodiment, the SES processor 602(1) is operable to alert the operating system driver that controls it (e.g., SES driver 332(1)) via an initial interrupt, and that it needs state information, such as servicing or synchronization information. The state information of the expanders may be, for example, the 'state' of the firmware in each expander. State information may include data needed to generate SAS addresses for SATA drives, data seen and read by the sensors 643, data regarding service of certain diagnostic pages as defined by the SES specification, data available from power supply 641, disks 23, or dongles 644, or the like. The state information may be stored in memory of the backplane (e.g., EEPROM 642), or may be read directly from the devices attached to, or residing on, the backplane 51. The initial interrupt can be caused by the use of a primitive command signal (e.g., BROADCAST(SES) primitive) by the expander that requires service, expander 504(1). This will make the SES driver 332(1) query the expander 504(1) for the reason it raised the interrupt. Once the reason is obtained by the SES driver 332(1), the SES driver 332(1) can use the cluster interconnect 653 (e.g., using cluster connect driver 633(1)) to communicate with the partner expander 504(2) in the same enclosure. The expander 504(1) can communicate with the expander 504(2) through cluster interconnect 653 with the help of the cluster interconnect driver 633(2), SES driver 632(2), and the SAS driver 631(2) of the partner operating system 630(2), to retrieve the state information, or to request an action on behalf of the expander 504(1), which requested the state information because of the malfunctioning interface between the expander 504(1) and backplane 51. The expander 504(1) can communicate with expander 504(2) using software communication paths, OS messages, hardware signals, application programming interfaces (APIs), or the like. Feeding and querying of information to and from a malfunctioning expander interface may be accomplished by vendor specific SES diagnostic pages.

In another embodiment, expander 504(2) can detect an interface failure and communicate with expander 504(1) to retrieve the state information from the backplane, in a similar manner as described above.

A couple of examples are given below of interface failures on the interface between one expander and the backplane, and the operations of the storage system to retrieve the state information from the other expander that has a functioning interface with the backplane. Both cases assume that the one of the I2C connection (e.g., interface 654(1) or 654(2)) between the expander and the backplane has failed.

In the first failure scenario, assume that one expander is unable to read the backplane EEPROM 642 to retrieve stored state information. Without the state information stored in backplane EEPROM, that expander could potentially be unable to generate SAS addresses to SATA drives, as it does when it is able to read the backplane EEPROM 642. This potentially could strain operations of the operating system and cause one head on an appliance to fail, constituting downtime or running on a degraded mode, both of which are not preferable. To prevent this from happening, using the apparatus and method described herein, the failing expander will transmit a BROADCAST(SES) primitive, alerting the controlling SES driver that it needs service. The SES driver queries the failing expander and finds out the reason for the interrupt. Then the SES driver will communicate with the partner expander using the cluster interconnect for the missing pieces of synchronization information from the EEPROM and will feed it to the failing expander. Then the SES driver will reinitialize the failing expander, so that it can generate a persistent set of SAS addresses to SATA drives.

In the second failure scenario, assume that expander has a bad single wire connection 756(1) to a dongle controller of a particular drive 644. In such a case, all dongle-controller-provided services, such as power on, power off, power cycle, control of LEDs associated with that drive, will not be available to the failing expander. In this case, the malfunctioning expander will ask the controlling SES driver, to ask the partner expander that has a similar single wire connection 756(2) to the same dongle controller 644, to carry out the operation on the drive in question, preventing a drive failure and/or other problems associated with a drive failure.

Figure 9:
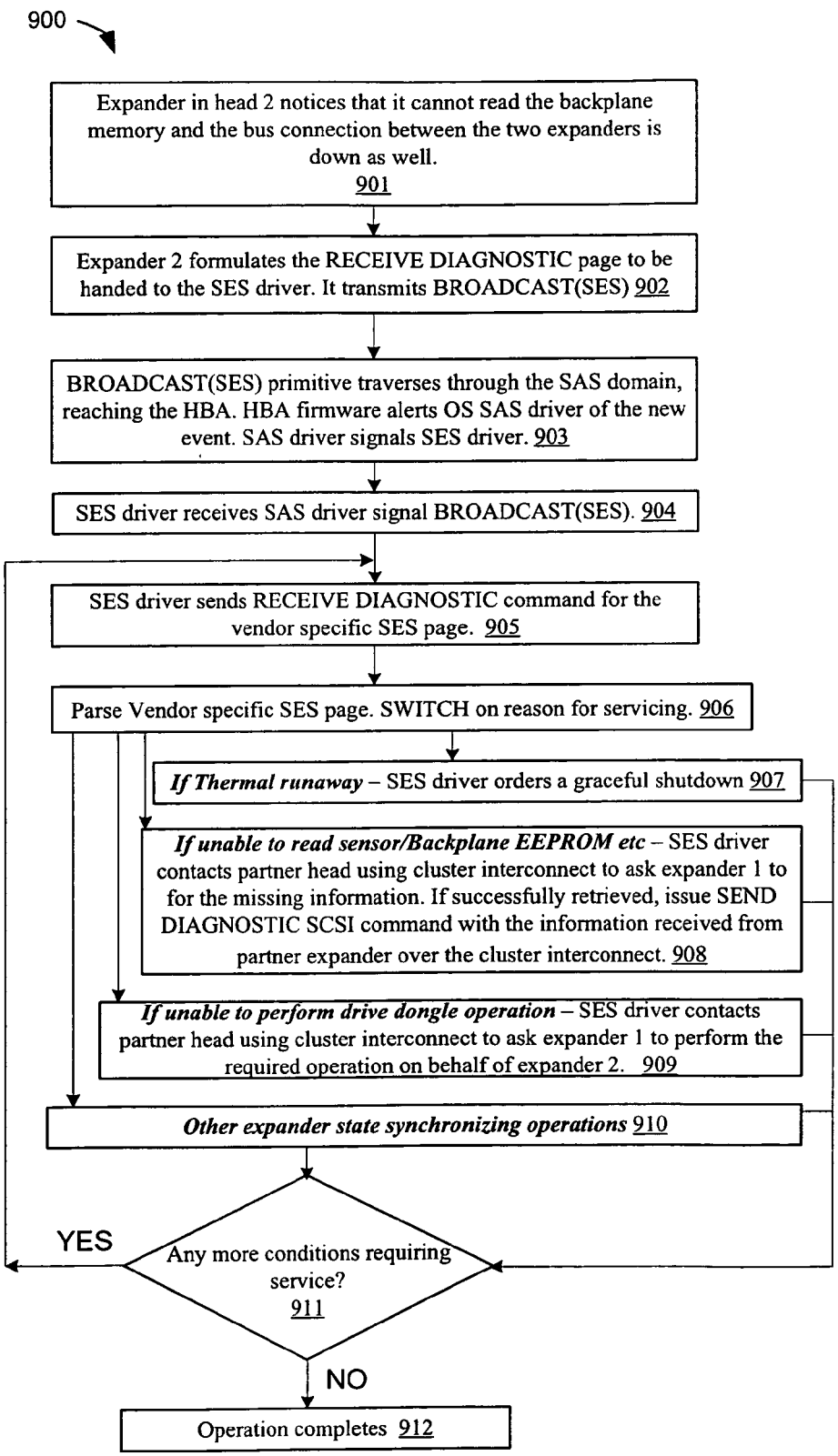
FIG. 9 illustrates a flow chart of another embodiment of a method for retrieving state information for a first expander from a second expander upon detecting an interface failure between the first expander and a backplane.

FIG. 9 illustrates a flow chart of another embodiment of a method 900 for retrieving state information for a first expander from a second expander upon detecting an interface failure between the first expander and a backplane. This embodiment includes a situation where the link between the two expanders has failed and expander 504(2) is unable to read the backplane EEPROM 642. This would constitute a catastrophic failure as expander 504(2) will not be able to assign consistent SAS WWN to the drives it controls. It also causes a loss of synchronization of the states in expander in the two heads. Alternatively, other scenarios where the expander is unable to perform drive dongle operations such as power on, power off, LED on and LED off etc, can be handled in a similar fashion. Handling of thermal runaway too can be handled in a similar way.

Upon power on reset, during expander 504(2) firmware initialization, the expander 504(2) notices that it cannot read the backplane EEPROM 642 (operation 901). This prevents expander 504(2) from generating persistent SAS addresses for SATA drives, which could prevent the operating system 630(2) from booting on storage server head 64(2). The expander 504(2) may notice that the interface 654(2) is down. Alternatively, the expander 504(2) may notice that both interface 654(2) and the interface 655 between the partner expander are down. This would normally constitute a complete failure. However, in this embodiment, the SES expander firmware module 604(2) in expander 504(2) formulates a RECEIVE DIAGNOSTIC page, as defined by the SES specification, intended to inform the SES processor firmware module 604(2) of the reason to require service (operation 902). This page can be vendor specific, but should contain as much information as possible to tell the host SES driver 632(2) about the failure. The SES firmware module 604(2) in expander 504(2) transmits a BROADCAST(SES) primitive (operation 902). BROADCAST(SES) primitive traverses the SAS topology to HBA 610(2) through SAS links 506(2) (operation 903). HBA firmware 611(2) of HBA 610(2) notices the receipt of BROADCAST(SES) primitive, and initiates an event to the host SAS driver 631(2) (operation 903). The method the HBA firmware 611(2) uses to notify the operating system of the arrival of a BROADCAST(SES) primitive may differ based on the manufacturer of the HBA. For example, an HBA manufactured by LSI Logic Corporation, Milpitas, Calif., may notify the operating system in a manner that is different than an HBA manufactured by Adaptec, Inc., Milpitas, Calif. SAS driver 631(2) notices the received event, sends an OS signal to the SES driver 632(2) (operation 903). The SES driver 632(2) receives SAS driver signal BROADCAST(SES) (operation 904). SES driver 632(2) sends a RECEIVE DIAGNOSTIC SCSI command using the SAS driver 631(2) to the SES processor 604(2) in expander 504(2) (operation 905). SES processor in expander 504(2) sends the already formulated SES page to SES driver 632(2) (operation 906). SES driver parses 632(2) the received SES page. The reason for the interruption is then determined based on the SES page. For example, the interruption may be caused by thermal runaway, inability to read sensors, inability to read the backplane EEPROM 642, inability to perform drive dongle operations, or other expander state synchronizing operations.

The SES driver may find the reason for the interruption to be the inability of the SES processor 602(2) in expander 504(2) to read the backplane EEPROM 642 (operation 908). It is possible that expander 504(1) of storage server head 64(1) was able to read the backplane EEPROM 642. So the SES driver 632(2), in storage server head 64(2), sends a request through the cluster interconnect 653 to the SES driver 632(1) in storage server head 64(1), that it needs the contents of the backplane EEPROM 642. SES driver 632(1), in storage server head 64(1), sends a RECEIVE DIAGNOSTIC command to SES processor 602(1) in expander 504(1) to get the contents of backplane EEPROM 642. Upon successful receipt of the requested information, SES driver 632(1) on storage server head 64(1) sends a reply to SES driver 632(2) in storage server head 64(2) with the contents of the backplane EEPROM 642. In addition, SES driver 632(2) in storage server head 64(2) sends a SEND DIAGNOSTIC SCSI command with another vendor specific SES page that contains the information retrieved form expander 504(1) in storage server head 64(1). SES processor 602(2) in storage server head 64(2) receives the SEND DIAGNOSTIC command and the data. SES processor 602(2) parses the data and finds the contents of the backplane EEPROM 642. Now SES processor 602(2) continues to initialize itself, generating the SAS addresses for the SATA drives, and thus enabling the operating system to boot, in the presence of failures of the connections between expander 504(2) and backplane EEROM 642 (on interface 654(2)) and/or connection between expander 504(1) and expander 504(2) (on interface 655). The storage server head 64(2) may operate in a degraded mode, but the storage server head 64(2) can boot and up time is maintained.

In another scenario, the interface failure may be thermal runaway. If a thermal runaway is the reason why SES processor interrupted the SES driver, the SES driver can gracefully shut the storage server down, preventing any possible loss of data (operation 907). For example, if the SES processor 602(1) in SAS expander 504(1) of head 64(1) detects a thermal runaway condition, but its interface 654(1) with the power supply 641 is down (e.g., due to an interface failure), then the SES processor 602(1) can ask the SES processor 602(2) in SAS expander 504(2) of head 64(2) to shut down the storage system. SES processor 602(1) can ask the SES processor 602(2) to shut down the storage system using interface 655. Alternatively, the SES processor 602(1) can use cluster interconnect 653, as described above.

In another scenario, the interface failure may be failure to perform a dongle operation. If the inability of expander 504(2) to perform a drive dongle operation was the reason why the SES processor 602(2) interrupted the SES driver 632(2), a similar method can be used to get expander 504(1) to execute the required operation on behalf of SES processor 602(2) of expander 504(2) (operation 909).

Alternatively, the interface failure may be caused other expander state synchronizing operations (operation 910). For any other loss of synchronization of the expander states, similar methods to those described above can be used to rectify the problem.

After performing any of the above operations, operations 907-910, it is determined whether anymore conditions require service (operation 911). If so, the method returns to operation 1105, in which the SES driver sends RECEIVE DIAGNOSTIC command for the vendor specific SES page. If no additional conditions require service, then the operation completes (operation 912).

Expander firmware may be operable to issue a BROADCAST(SES) primitive when it requires SES driver servicing. Expander firmware may be operable to generate a specific SES page that can be read by the host SES driver that conveys information about why the SES processor needs servicing. Reasons for asking for host services can include inability to the read sensors or backplane EEPROM, to do drive operations, etc. A field in this new SES page could be included to describe the exact reason why the BROADCAST(SES) was transmitted.

The SAS HBA can be configured to be capable of accepting the BROADCAST(SES) primitive, and of converting the received BROADCAST(SES) primitive to an event that can be delivered to the SAS driver. In one embodiment, the storage server head may use a HBA, such as 1068E HBA, manufactured by LSI Logic, Milpitas, Calif. The HBA may have a message passing interface (MPI) architecture. MPI defines a method to let the host driver know when the HBA receives a BROADCAST(SES) primitive.

The SAS driver is operable to accept events from the HBA, indicating the receipt of a BROADCAST(SES) primitive. In such an event, a signal is sent to the SES driver to alert the SES driver that the SES processor in the expander needs servicing.

The SES driver is operable to query the SES processor in the expander on why servicing is needed. The regular SCSI command RECEIVE DIAGNOSTIC may be used to accomplish this step. Note that the contents of the SES page that are returned may be vendor specific. The SES driver may also be operable to act on conditions indicated by the SES processor. For an example, as described above, if the SES processor indicates that it cannot read the EEPROM, the SES driver can communicate with the SES drive of the partner using the cluster interconnect. To do so, the SES driver can determine whether the expander on the partner head is able to read the backplane EEPROM, and if so, if it would return the data to the SES driver, which will then be transferred over the cluster interconnect to the initiating party. The initiating SES driver then can send a SEND DIAGNOSTIC SCSI command to the SES processor in the expander to pass the state information retrieved form the backplane EEPROM. In one embodiment, the storage server head may issue Automatic Supports (ASUPs) or Event Messaging System (EMS) logs when critical events occur. ASUPs can be emails sent by filers when the filer detects an error condition to whomever the filer administrator has configured to be the recipients.

The embodiments described herein may be used to reduce the downtime of storage system components by reducing the number of places of possible failures. For example, if there is no I2C connection between the expanders and there is a failure on the interface between one of the expanders and the backplane, the interface failure can be successfully handled using the embodiments described herein. In another example that assumes that the I2C connection between the expanders became inoperative, which may prevent one expander from communicating with the other expander directly, using the embodiments described herein the interface failures can also be successfully handled.

One example of possible failures is where the I2C connection between the expander and the backplane SEEPROM becomes inoperative. In this scenario, the expander can request the partner expander to send the relevant information using the cluster interconnect. Another example is when the expander cannot read the chassis power supply status. In this scenario, the expander can request the partner expander to send the relevant information using the cluster interconnect. Similarly, if the expander cannot perform any disk power management actions items such as power on, power off, power cycle for any of the disks it controls, the expander can ask the partner expander to perform the required action.

In one embodiment, the I2C connection between the expanders can be eliminated as a single point of failure and expander states can be kept in synchronization using the BROADCAST(SES) mechanism and the cluster interconnect. Typically, the SES driver of the OS polls for the status of the enclosure and associated sensors. The use of BROADCAST(SES) primitive makes it possible to notify the host and therefore the driver stack of any asynchronous event. This reduces the catastrophic events such as thermal runaways, because as soon as the expander becomes aware of such a threat, it can send a BROADCAST(SES) primitive to start a sequence of events, which obtains the system action for correcting the situation.

It should be noted that there may be no side effects of using BROADCAST(SES) primitive because SAS initiators already pass the primitive to the driver stack. However, conventionally, SAS targets simply ignore such primitives according to the SAS specification.

Embodiments of the present invention include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, etc.); or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The digital processing device(s) described herein may include one or more general-purpose processing devices such as a microprocessor or central processing unit, a controller, or the like. Alternatively, the digital processing device may include one or more special-purpose processing devices such as a digital signal processor (DSP), an application specific integrated circuit (ASIC), a field programmable gate array (FPGA), or the like. In an alternative embodiment, for example, the digital processing device may be a network processor having multiple processors including a core unit and multiple microengines. Additionally, the digital processing device may include any combination of general-purpose processing device(s) and special-purpose processing device(s).

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method, in a storage system which has first and second expanders that are configured to couple to a plurality of devices, the method comprising:
    detecting an interface failure of a first interface of the first expander, wherein the first interface is configured to retrieve state information of the storage system for the first expander; and
    retrieving the state information from a second expander to the first expander using a second interface of the first expander when the interface failure of the first interface is detected, wherein the state information normally available to the first expander through the first interface is unavailable through the first interface due to the interface failure of the first interface, wherein retrieving the state information from the second expander comprises:
        notifying the second expander of the interface failure by sending an interrupt from a first driver of a first operating system, associated with the first expander, to a second driver of a second operating system, associated with the second expander; and
        receiving the state information from the second expander in response to notifying the second expander of the interface failure.

2. The method of claim 1, wherein the state information is at least one of servicing information or synchronization information.

3. The method of claim 1, wherein the state information is stored in a memory coupled to the first and second expanders.

4. The method of claim 1, wherein the first interface is between the first expander and a backplane, and wherein retrieving the state information from the second expander comprises retrieving the state information on a third interface between the second expander and the backplane.

5. The method of claim 4, wherein the state information is stored in a memory coupled to the backplane.

6. The method of claim 4, wherein the second interface comprises a direct interconnect between the first and second expanders.

7. The method of claim 4, wherein the second interface comprises a cluster interconnect between a first head that comprises the first expander and a second head that comprises the second expander.

8. A method, in a storage system which has first and second expanders that are configured to couple to a plurality of devices, the method comprising:
    detecting an interface failure of a first interface of the first expander, wherein the first interface is configured to retrieve state information of the storage system for the first expander; and
    retrieving the state information from a second expander to the first expander using a second interface of the first expander when the interface failure of the first interface is detected, wherein the state information normally available to the first expander through the first interface is unavailable through the first interface due to the interface failure of the first interface, and wherein retrieving the state information from the second expander comprises:
        notifying the second expander of the interface failure; and
        receiving the state information from the second expander in response to notifying the second expander of the interface failure, wherein notifying the second expander of the interface failure comprises:
            notifying a first bus adapter of the interface failure, wherein the first bus adapter resides in a first storage server head, which comprises the first expander;
            sending an interrupt to a first driver of a first operating system of a first storage server head;
            sending the interrupt to a second driver of a second operating system of a second storage server head, which comprises the second expander; and
            notifying a second bus adapter of the interface failure.

9. The method of claim 8, wherein the interrupt is a broadcast primitive that is a notification of an asynchronous event.

10. The method of claim 1, wherein the first interface is between the first expander and a backplane, wherein detecting the interface failure comprises at least one of:
    detecting a memory interface failure on a memory interface of the first interface, wherein the memory interface is between an non-volatile memory, coupled to the backplane, and the first expander;
    detecting the interface failure on a sensor interface of the first interface, wherein the sensor interface is between a sensor, coupled to the backplane, and the first expander;
    detecting the interface failure on a power interface of the first interface, wherein the power interface is between a power supply, coupled to the backplane, and the first expander; and
    detecting the interface failure on a disk interface of the first interface, wherein the disk interface is between a disk, coupled to the backplane, and the first expander.

11. An apparatus comprising:
    a first expander having first and second interfaces, wherein the first interface is configured to retrieve state information of a storage system for the first expander, wherein the first expander is configured to detect an interface failure of the first interface; and a second expander coupled to the first expander using the second interface, wherein the first expander is configured to retrieve state information from the second expander to the first expander using the second interface when the interface failure of the first interface is detected, and wherein the state information normally available to the first expander through the first interface is unavailable through the first interface due to the interface failure of the first interface, and wherein the first expander is configured to notify the second expander of the interface failure by sending an interrupt from a first driver of a first operating system, associated with the first expander, to a second driver of a second operating system, associated with the second expander, and to receive the state information from the second expander in response to the notification.

12. The apparatus of claim 11, wherein the state information is at least one of servicing information or synchronization information.

13. The apparatus of claim 11, further comprising a backplane of an enclosure coupled to the first expander using the first interface, and to the second expander using a third interface.

14. The apparatus of claim 4, wherein the second interface comprises a direct interconnect between the first and second expanders.

15. The apparatus of claim 4, wherein the second interface comprises a cluster interconnect between a first head that comprises the first expander and a second head that comprises the second expander.

16. The apparatus of claim 11, wherein the first expander comprises a first processor, wherein the first processor is operable to detect the interface failure of the first interface, to notify a second processor of the second expander of the interface failure using the second interface, and to receive the state information from the second expander using the second interface.

17. The apparatus of claim 13, further comprising a non-volatile memory coupled to the backplane, wherein the non-volatile memory is operable to store state information for the first and second expanders.

18. The apparatus of claim 13, further comprising a disk coupled to the backplane, wherein the disk is operable to store data.

19. The apparatus of claim 13, further comprising a dongle coupled to the backplane, wherein the dongle is operable to power on, power off, power cycle, or control LEDs of a drive.

20. The apparatus of claim 13, further comprising a power supply coupled to the backplane, wherein the power supply is operable to supply power to the first and second storage server heads.

21. The apparatus of claim 13, further comprising a voltage sensor coupled to the backplane, wherein the voltage sensor is operable to monitor a voltage level.

22. The apparatus of claim 13, further comprising a temperature sensor coupled to the backplane, wherein the temperature sensor is operable to monitor a temperature level.

23. The apparatus of claim 13, further comprising:
a plurality of storage devices within the enclosure, coupled to the backplane;
a first storage server head comprising the first expander, wherein the first storage server head is operable to control access to the plurality of storage devices by at least one client; and
a second storage server head comprising the second expander, wherein the second storage server head is operable to control access to the plurality of storage devices by at least client redundantly to the first storage server head.

24. An apparatus, comprising:
a backplane of an enclosure of a storage system;
a plurality of storage devices within the enclosure, coupled to the backplane;
a first storage server head comprising a first expander having first and second interfaces, wherein the first storage server head is operable to control access to the plurality of storage devices by at least one client, and wherein the first interface is configured to retrieve state information of the storage system for the first expander, wherein the first expander is configured to detect an interface failure of the first interface, and wherein the first storage server head comprises:
a first operating system, which has at least one driver to communicate information over a common interconnect; and
a first bus adapter coupled to the first expander and the at least one driver of the first operating system; and
a second storage server head comprising a second expander, wherein the second storage server head is operable to control access to the plurality of storage devices by the at least one client redundantly to the first storage server head, wherein the first expander is configured to retrieve state information from the second expander to the first expander using the second interface when the interface failure of the first interface is detected, and wherein the state information normally available to the first expander through the first interface is unavailable through the first interface due to the interface failure of the first interface, wherein the second storage server head comprises:
a second operating system, which has at least one driver to communicate information over the common interconnect;
a second bus adapter coupled to the second expander and the at least one driver of the second operating system, and wherein the common interconnect is the second interface.

25. An apparatus, comprising:
a backplane of an enclosure of a storage system;
a plurality of storage devices within the enclosure, coupled to the backplane;
a first input-output (IO) module within the enclosure, coupled to the backplane, wherein the first IO module comprises a first expander having first and second interfaces, wherein the first interface is configured to retrieve state information of the storage system for the first expander, and wherein the first expander is configured to detect an interface failure of the first interface;
a first storage server head not within the enclosure, coupled to the first IO module, wherein the first storage server head is operable to control access to the plurality of storage devices by at least one client using the first IO module;
a second IO module within the enclosure, coupled to the backplane, wherein the second IO module comprises a second expander having a third interface coupled to the backplane of the enclosure, wherein the first expander is configured to retrieve state information from the second expander to the first expander using the second interface when the interface failure of the first interface is detected, and wherein the state information normally available to the first expander through the first interface is unavailable through the first interface due to the interface failure of the first interface; and a second storage server head not within the enclosure, coupled to the second IO module, wherein the first storage server head is operable to control access to the plurality of storage devices by at least one client redundantly to the first storage server head using the second IO module.

26. The apparatus of claim 25, wherein the first storage server head comprises:
a first operating system, which has at least one driver to communicate information over a common interconnect between the first and second storage server heads;
a first bus adapter coupled to the first expander and the at least one driver of the first operating system, wherein the second storage server head comprises:
a second operating system, which has at least one driver to communicate information over the common interconnect; and
a second bus adapter coupled to the second expander and the at least one driver of the second operating system, and wherein the common interconnect is the second interface.

27. The apparatus of claim 13, wherein the backplane comprises at least one of:
a non-volatile memory;
a voltage sensor;
a temperature sensor;
a current sensor; or
a power supply.

28. The apparatus of claim 13, wherein the first, second, and third interfaces are inter-integrated circuit (I2C) buses.

29. The apparatus of claim 13, wherein the second interface is at least one of a Serial Attached Small computer system interface (SAS) interconnect, an Infiniband interconnect, or an Ethernet interconnect.

30. A system, comprising:
an enclosure;
a backplane within the enclosure;
a plurality of storage devices within the enclosure, coupled to the backplane;
a first storage server head coupled to the backplane through a first interface, wherein the first storage server head comprises a first expander; and
a second storage server head coupled to the backplane through a second interface, wherein the second storage server head comprises a second expander, wherein the first and second storage server heads are coupled through a third interface, wherein the first expander is operable to detect an interface failure of the first interface, and to retrieve state information from the second expander through the third interface, and wherein the first expander is operable to retrieve the state information by notifying the second expander of the interface failure by sending an interrupt from a first driver of a first operating system, associated with the first expander, to a second driver of a second operating system, associated with the second expander, through the third interface, and to receive the state information from the second expander in response to the notification through the third interface.

31. The system of claim 30, wherein the first and second storage server heads each comprise:
an embedded expander processor;
a bus adapter coupled to the embedded expander processor; and
an operating system, wherein the operating system comprises:
an operating system driver;
an enclosure services driver; and
a cluster interconnect driver.

32. The system of claim 31, wherein the first and second expanders are Serial Attached Small computer system interface (SAS) expanders, the bus adapters are SAS bus adapters, and the operating system driver is a SAS driver.

* * * * *